United States Patent
Lee et al.

(10) Patent No.: US 8,416,877 B2
(45) Date of Patent: Apr. 9, 2013

(54) UNITARY PRECODING APPARATUS AND METHOD IN MULTI-USER MULTIPLE INPUT MULTIPLE OUTPUT (MIMO) COMMUNICATION SYSTEM

(75) Inventors: Hyoung Joo Lee, Seoul (KR); Ill Soo Sohn, Seoul (KR); Kwang Bok Lee, Seoul (KR); Chang Soon Park, Chungju-si (KR); Sung Jin Kim, Suwon-si (KR)

(73) Assignees: Samsung Electronics Co., Ltd., Suwon-si (KR); SNU R&DB Foundation, Seoul (KR)

(*) Notice: Subject to any disclaimer, the term of this patent is extended or adjusted under 35 U.S.C. 154(b) by 314 days.

(21) Appl. No.: 12/850,713

(22) Filed: Aug. 5, 2010

(65) Prior Publication Data

US 2011/0158335 A1   Jun. 30, 2011

(30) Foreign Application Priority Data

Dec. 30, 2009 (KR) .................. 10-2009-0133633

(51) Int. Cl.
*H04B 7/02* (2006.01)

(52) U.S. Cl.
USPC ............................ 375/267; 375/220; 375/285

(58) Field of Classification Search .................. 375/267, 375/285, 220
See application file for complete search history.

(56) References Cited

U.S. PATENT DOCUMENTS

| | | | |
|---|---|---|---|
| 6,058,105 A | 5/2000 | Hochwald et al. | |
| 6,760,388 B2 | 7/2004 | Ketchum et al. | |
| 2004/0192218 A1 | 9/2004 | Oprea | |
| 2008/0298482 A1* | 12/2008 | Rensburg et al. | 375/260 |
| 2009/0122889 A1* | 5/2009 | Lee et al. | 375/260 |

FOREIGN PATENT DOCUMENTS

| | | |
|---|---|---|
| KR | 10-2005-0043670 | 5/2005 |
| KR | 10-2005-0055592 | 6/2005 |
| KR | 10-2006-0028989 | 4/2006 |
| WO | WO 2006/052890 | 5/2006 |

* cited by examiner

*Primary Examiner* — Sam K Ahn
*Assistant Examiner* — Janice Tieu
(74) *Attorney, Agent, or Firm* — NSIP Law

(57) ABSTRACT

In a multi-user multiple input multiple output (MIMO) communication system using the same radio resource, a unitary matrix may be generated to remove interference signals and enhance a transmission capacity. The unitary matrix may be used for precoding. Vectors included in the unitary matrix may have a most similar direction to precoding vectors of target terminal devices and may be orthogonal to each other.

22 Claims, 6 Drawing Sheets

UNITARY PRECODING APPARATUS AND METHOD IN MULTI-USER MULTIPLE INPUT MULTIPLE OUTPUT (MIMO) COMMUNICATION SYSTEM

CROSS-REFERENCE TO RELATED APPLICATION(S)

This application claims the benefit under 35 U.S.C. §119 (a) of Korean Patent Application No. 10-2009-0133633, filed on Dec. 30, 2009, in the Korean Intellectual Property Office, the entire disclosure of which is incorporated herein by reference for all purposes.

BACKGROUND

1. Field

The following description relates to technology that may remove or reduce interference occurring when multiple users use the same radio resource in a communication system using multiple antennas, and may enhance throughput of the communication system regardless of the existence of interference.

2. Description of Related Art

Currently, research regarding a communication system including a plurality of cells is actively ongoing to enhance a data rate and a communication reliability. The plurality of cells may include a cellular base station, a femto base station, a fixed base station or a mobile base station, a relay station, and terminal devices.

In the plurality of cells, a plurality of base stations may communicate with corresponding terminal devices using the same radio resource, for example, a frequency, a time, a code resource, and the like, to enhance the usage efficiency of radio resources.

When a plurality of terminal devices belonging to a single base station uses the same radio frequency and each of the terminal devices includes a plurality of antennas, interference may occur in each of the terminal devices. Due to the interference, throughput may decrease. A target terminal device belonging to the base station may receive intra cell interference occurring due to a signal transmitted from the base station to terminal devices.

Accordingly, there is a desire for technology that may enhance the usage efficiency of radio resources and may also reduce the decrease in throughput caused by the interference.

SUMMARY

In one general aspect, a unitary precoding apparatus includes a plurality of antennas to transmit a common pilot to a plurality of terminal devices, and to receive feedback information generated based on the common pilot, a terminal selector to select at least two target terminal devices from the plurality of terminal devices based on the feedback information, a precoding matrix generator to generate a precoding matrix including precoding vectors of the selected at least two target terminal devices, and a unitary matrix preprocessor to generate a unitary matrix including vectors being identical to the precoding vectors or vectors adjacent to the precoding vectors, based on each of the precoding vectors, and to precode data based on the generated unitary matrix.

The unitary matrix preprocessor may generate a unitary matrix including vectors having a direction increasing a sum of inner products with respect to the precoding vectors.

The vectors being identical to the precoding vectors or the vectors having the direction adjacent to the precoding vectors may be orthogonal to each other.

The unitary matrix preprocessor may divide the precoding matrix into a plurality of sub-precoding matrices, and regenerates the unitary matrix through multiplication of sub-precoding matrices corresponding to the unitary matrix among the divided sub-precoding matrices.

The unitary matrix preprocessor may include a calculator to calculate unitary vectors maximizing a sum of inner products with respect to the precoding vectors, and a unitary matrix generator to regenerate the unitary matrix including the calculated unitary vectors.

The unitary matrix preprocessor may precode the data based on the unitary matrix to insert effective channel information into the precoded data. Each of the antennas may transmit the precoded data with the inserted effective channel information to the at least two target terminal devices via a dedicated pilot. The effective channel information may include the unitary matrix.

In another general aspect, a unitary precoding method includes transmitting a common pilot to a plurality of terminal devices, receiving feedback information generated based on the common pilot, selecting at least two target terminal devices from the plurality of terminal devices based on the feedback information, generating a precoding matrix including precoding vectors of the at least two target terminal devices, generating a unitary matrix including vectors being identical to the precoding vectors or vectors adjacent to the precoding vectors, based on each of the precoding vectors, and precoding data based on the generated unitary matrix.

In still another general aspect, a terminal device using unitary precoding includes a channel estimator to estimate a channel state of a channel formed between the terminal device and a precoding apparatus based on a common pilot, an information generator to generate feedback information based on the estimated channel state, at least one antenna to feed back the channel state to the precoding apparatus, and to receive data precoded based on the feedback information, a decoding matrix generator to extract effective channel information from the precoded data, and to generate a unitary decoding matrix based on the effective channel information, and a decoder to decode the precoded data based on the unitary decoding matrix.

A unitary matrix included in the effective channel information may include vectors being identical to precoding vectors generated based on the feedback information, or vectors adjacent to the precoding vectors, based on each of the precoding vectors.

The vectors having the direction adjacent to the precoding vectors may correspond to vectors having a direction increasing a sum of inner products with respect to the precoding vectors.

The vectors being identical to the precoding vectors or the vectors having the direction adjacent to the precoding vectors may be orthogonal to each other. The precoded data may be received via a dedicated pilot.

In yet another aspect, a unitary decoding method includes estimating a channel state based on a common pilot, generating feedback information based on the estimated channel state, feeding back the feedback information, extracting, from precoded data, effective channel information generated based on the feedback information, generating a unitary decoding matrix based on the effective channel information, and decoding the precoded data based on the unitary decoding matrix.

A unitary matrix included in the effective channel information may include vectors being identical to precoding vectors generated based on the feedback information, or vectors adjacent to the precoding vectors, based on each of the precoding vectors.

In another general aspect, a non-transitory computer-readable storage medium storing a program for instructing a computer to perform a unitary precoding method, including: transmitting a common pilot to a plurality of terminal devices, receiving feedback information generated based on the common pilot, selecting at least two target terminal devices from the plurality of terminal devices based on the feedback information, generating a precoding matrix including precoding vectors of the at least two target terminal devices, generating a unitary matrix including vectors identical to the precoding vectors or vectors adjacent to the precoding vectors, based on each of the precoding vectors, and precoding data based on the generated unitary matrix.

In another general aspect, a non-transitory computer-readable storage medium storing a program for instructing a computer to perform a unitary decoding method, including: estimating a channel state based on a common pilot, generating feedback information based on the estimated channel state, feeding back the feedback information, extracting, from precoded data, effective channel information generated based on the feedback information, generating a unitary decoding matrix based on the effective channel information, and decoding the precoded data based on the unitary decoding matrix, wherein a unitary matrix included in the effective channel information includes vectors identical to precoding vectors generated based on the feedback information, or vectors adjacent to the precoding vectors, based on each of the precoding vectors.

Other features and aspects will be apparent from the following detailed description, the drawings, and the claims.

Figure 1:
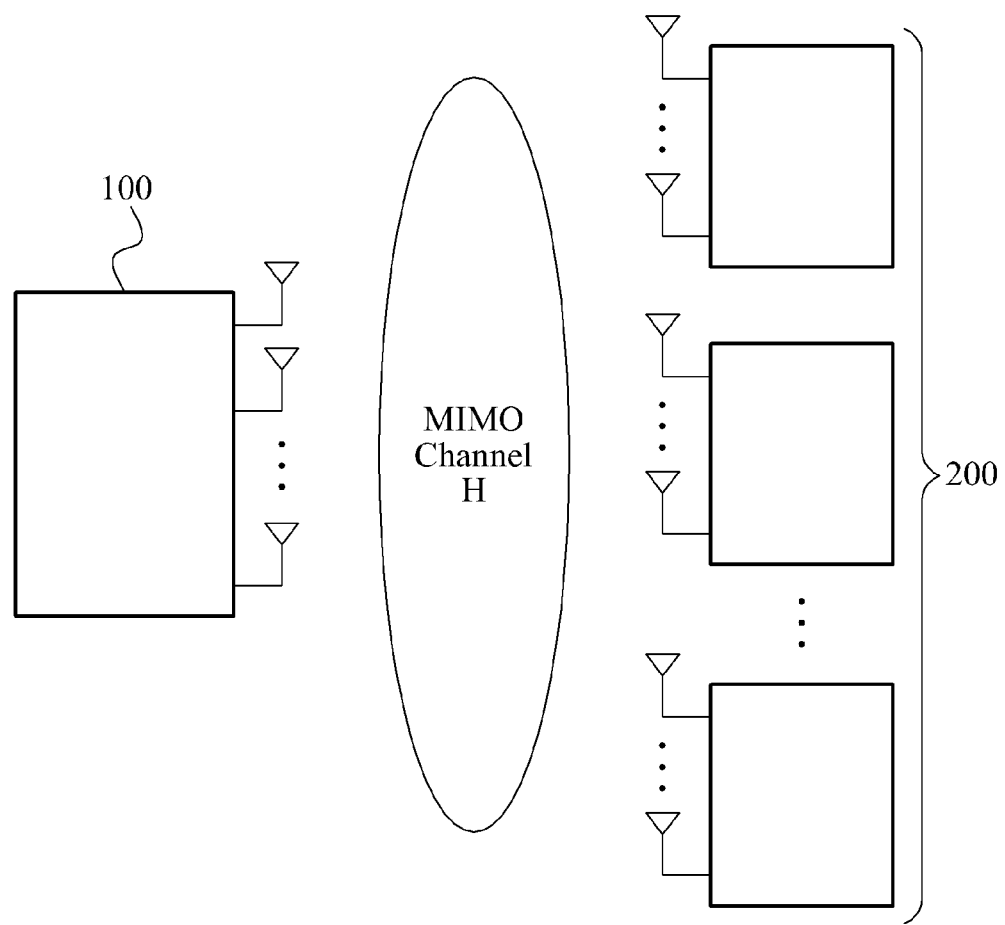
FIG. 1 is a diagram illustrating a multi-user multiple input multiple output (MIMO) communication system according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a multi-user multiple input multiple output (MIMO) communication system according to an embodiment.

Referring to FIG. 1, the multi-user MIMO communication system includes a precoding apparatus 100 and a plurality of terminal devices 200. The precoding apparatus 100 communicates with the terminal devices 200 through MIMO channel H.

When the precoding apparatus 100 and the plurality of terminal devices 200 use the same radio resource, interference may occur in the plurality of terminal devices 200. Accordingly, embodiments may remove or appropriately handle the interference, or may enhance the capacity of the multi-user MIMO communication system regardless of the interference.

1. Unitary Beamforming Scheme:

The unitary beamforming scheme may be used to remove interference occurring in the plurality of terminal devices 200.

When the unitary beamforming scheme is used, the precoding apparatus 100 and the plurality of terminal devices 200 may share a codebook. The codebook may include a fixed unitary matrix.

The precoding apparatus 100 may obtain, from the codebook, precoding vectors corresponding to the plurality of terminal devices 200 based on channel direction information fed back from the plurality of terminal devices 200. When the unitary beamforming scheme is used, the channel direction information may include transmission precoding vector information $p_k$ preferred by the terminal devices 200. Here, k denotes an index of a corresponding terminal device.

The precoding apparatus 100 may transmit, to a target terminal device, data precoded based on the obtained precoding vectors. The target terminal device may be identical to a terminal device having transmitted a precoding data used to precode the data.

Since the unitary beamforming scheme uses a fixed unitary matrix through the codebook, loss in the transmission capacity may increase according to a decrease in a number of target terminal devices.

2. Zero-Forcing Beamforming (ZFBF) Scheme:

The zero-forcing beamforming (ZFBF) scheme may be used to remove interference occurring in the plurality of terminal devices 200.

When the ZFBF scheme is used, the precoding apparatus 100 may transmit, to the plurality of terminal devices 200, data precoded based on channel direction information. The channel direction information may be fed back from the plurality of terminal devices 200, and may include channel vector information corresponding to respective terminal devices 200.

The precoding apparatus 100 may transmit, to a target terminal device, data precoded based on the channel vector information.

When the ZFBF scheme is used, channel vector information may be fed back from the plurality of terminal devices 200. Accordingly, feedback overhead may increase and throughput may be deteriorated in a low signal-to-interference plus noise ratio (SINR) area.

Hereinafter, a unitary precoding/decoding apparatus and method that may provide a low complexity and may enhance a data rate regardless of a SINR area and a number of terminal devices will be described.

Figure 2:
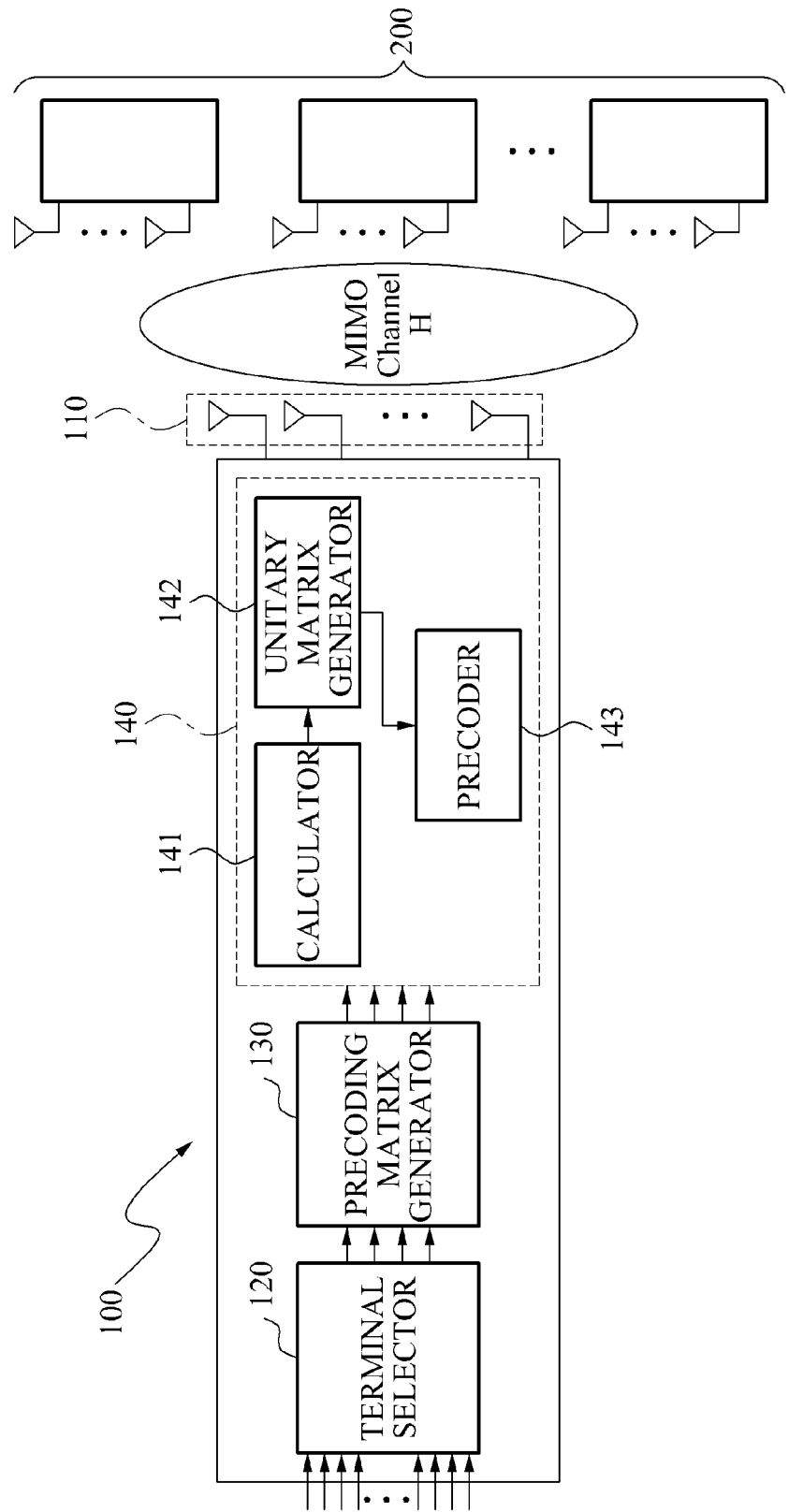
FIG. 2 is a diagram illustrating a configuration of a precoding apparatus according to an embodiment.

FIG. 2 illustrates a configuration of a precoding apparatus 100 according to an embodiment.

Referring to FIG. 2, the precoding apparatus 100 includes a plurality of antennas 110, a terminal selector 120, a precoding matrix generator 130, and a unitary matrix preprocessor 140.

The precoding apparatus 100 may transmit a common pilot to a plurality of terminal devices 200, and receive feedback information from the plurality of terminal devices 200 via the plurality of antennas 110. The feedback information may be generated based on the common pilot by each of the terminal devices 200. The feedback information may include channel direction information and channel quality information.

For example, the channel direction information may include transmission precoding vector information preferred by each of the terminal devices 200, and the channel quality information may include a SINR of each of the terminal devices 200. Each of the terminal devices 200 may quantize a corresponding precoding vector and a SINR, and may feed back the quantized precoding vector and SINR to the precoding apparatus 100.

The terminal selector 120 may select target terminal devices from the plurality of terminal devices 200 based on the received feedback information. For example, the terminal selector 120 may select at least two target terminal devices.

The terminal selector 120 may select the target terminal devices from the plurality of terminal devices 200 using a maximum SINR user selection scheme or a modified greedy user selection scheme.

When the maximum SINR user selection scheme is used, the terminal selector 120 may select the target terminal devices based on the channel quality information.

When the terminal selector 120 selects two target terminal devices from three terminal devices, the terminal selector 120 may compare SINRs of the three terminal devices, and select two target terminal devices in a descending order of SINRs.

For example, when a first terminal device has a SINR of 10 dB, a second terminal device has a SINR of 15 dB, and a third terminal device has a SINR of 5 dB, the terminal selector 120 may sequentially select the second terminal device having the largest SINR and the first terminal device having a second largest SINR 10 dB.

When the modified greedy user selection scheme is used, the terminal selector 120 may select target terminal devices based on channel quality information and channel direction information.

For example, the terminal selector 120 may select, as the target terminal devices, terminal devices maintaining the orthogonality between precoding vectors corresponding to the terminal devices 200 and having a relatively large SINR based on the channel direction information.

"On Downlink Beamforming With Greedy User Selection: Performance Analysis and a Simple New Algorithm," Goran Dimić and Nicholas D. Sidiropoulos, *IEEE Trans. on Signal Processing*, vol. 53, no. 10, October 2005, discloses a process of selecting target terminal devices based on channel quality information and channel direction information.

The precoding matrix generator 130 may generate a precoding matrix based on channel quality information corresponding to the selected target terminal devices.

For example, the precoding matrix generator 130 may generate a precoding matrix P as given by the following Equation 1.

$$P=[p_1 p_2 \ldots p_{N_t}] \qquad \text{[Equation 1]}$$

In Equation 1, $N_t$ denotes a number of antennas included in the precoding apparatus 100.

When two target terminal devices are selected, the precoding matrix generator 130 may generate the precoding matrix including precoding vectors $p_1$ and $p_2$ corresponding to the selected target terminal devices.

The unitary matrix preprocessor 140 includes a calculator 141, a unitary matrix generator 142, and a precoder 143.

The unitary matrix preprocessor 140 may generate a unitary matrix including vectors adjacent to precoding vectors of the selected target terminal devices, based on each of the precoding vectors.

Figure 3:
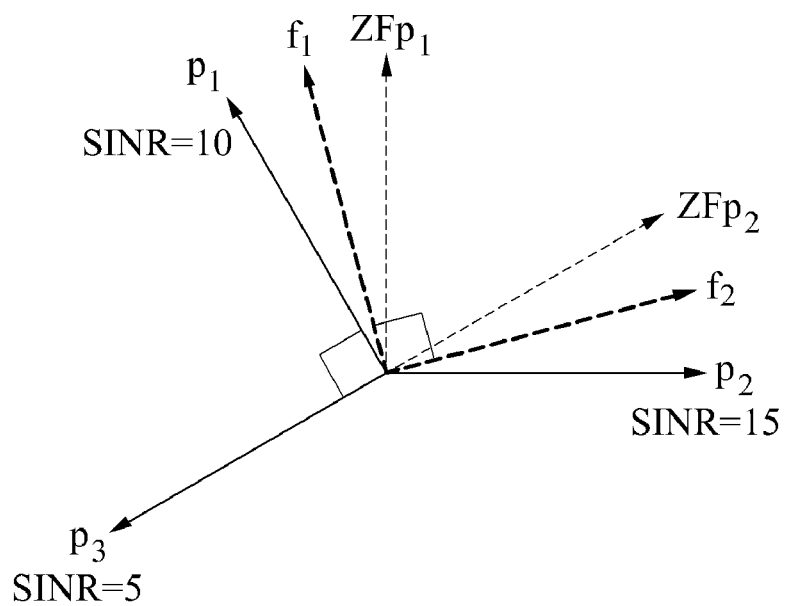
FIG. 3 is a diagram to describe a process of generating a unitary matrix based on feedback information according to an embodiment.

Referring to FIG. 3, the unitary matrix preprocessor 140 may calculate unitary vectors $f_1$ and $f_2$ having a direction increasing a sum of inner products with respect to precoding vectors $p_1$ and $p_2$. The unitary matrix preprocessor 140 may generate the unitary matrix including the calculated unitary vectors $f_1$ and $f_2$. The calculated unitary vectors $f_1$ and $f_2$ may be orthogonal to each other.

For example, the unitary matrix preprocessor 140 may divide the precoding matrix into a plurality of sub-precoding matrices to calculate unitary vectors increasing the sum of inner products.

The unitary matrix preprocessor 140 may divide the precoding matrix into the plurality of sub-precoding matrices using a singular value decomposition (SVD) scheme. The divided sub-precoding matrices may be expressed by the following Equation 2.

$$P=[p_1 p_2 \ldots p_{N_t}]=U\Sigma V^H \qquad \text{[Equation 2]}$$

The unitary matrix preprocessor 140 may generate the unitary matrix through multiplication of sub-precoding matrices corresponding to the unitary matrix among the divided sub-precoding matrices.

For example, when the unitary matrix is generated using an inner product, the calculator 141 may calculate the unitary vectors $f_1$ and $f_2$ maximizing the sum of inner products with respect to the precoding vectors $p_1$ and $p_2$ corresponding to the selected target terminal devices.

The unitary matrix generator 142 may regenerate the unitary matrix including the calculated unitary vectors $f_1$ and $f_2$. The unitary vectors $f_1$ and $f_2$ may be identical to the precoding vectors $p_1$ and $p_2$ of FIG. 3, or may be vectors having a most similar direction to the precoding vectors $p_1$ and $p_2$. The unitary vectors $f_1$ and $f_2$ may be orthogonal to each other.

For example, the unitary matrix generator 142 may regenerate the unitary matrix according to the following Equation 3.

$$F = \arg \max_{FF^H=F^HF=I} \sum_{i=1}^{N_t} |p_i^H f_i|. \qquad \text{[Equation 3]}$$

According to Equation 3, the unitary matrix generator 142 may regenerate the unitary matrix maximizing a sum of inner products between precoding vectors, fed back from the selected target terminal devices, and the vectors having the most adjacent direction to the precoding vectors. The vectors included in the regenerated unitary matrix may be orthogonal to each other.

For example, $f_1$ and $f_2$ included in the generated unitary matrix may be orthogonal to each other, maximizing the sum of inner products.

The precoder 143 may precode data to be transmitted to the selected target terminal devices, using the regenerated unitary matrix. The plurality of antennas 110 may transmit the precoded data to the target terminal devices via a dedicated pilot.

The precoder 143 may precode data and insert effective channel information into the precoded data.

For example, the precoded data transmitted to the target terminal devices may be expressed by the following Equation 4.

$$H_i F \bar{d}_j.$$  [Equation 4]

In Equation 4, $H_i$ denotes a channel matrix between the precoding apparatus 100 and each of the target terminal devices, F denotes a unitary matrix, and $\bar{d}_i$ denotes data to be transmitted to an $i^{th}$ target terminal device.

According to Equation 4, the precoder 143 may precode data through multiplication of the unitary matrix F, the channel matrix $H_i$, and the data $\bar{d}_i$. Effective channel information $H_{eff}$ may include the channel matrix $H_i$ and the unitary matrix F.

Figure 4:
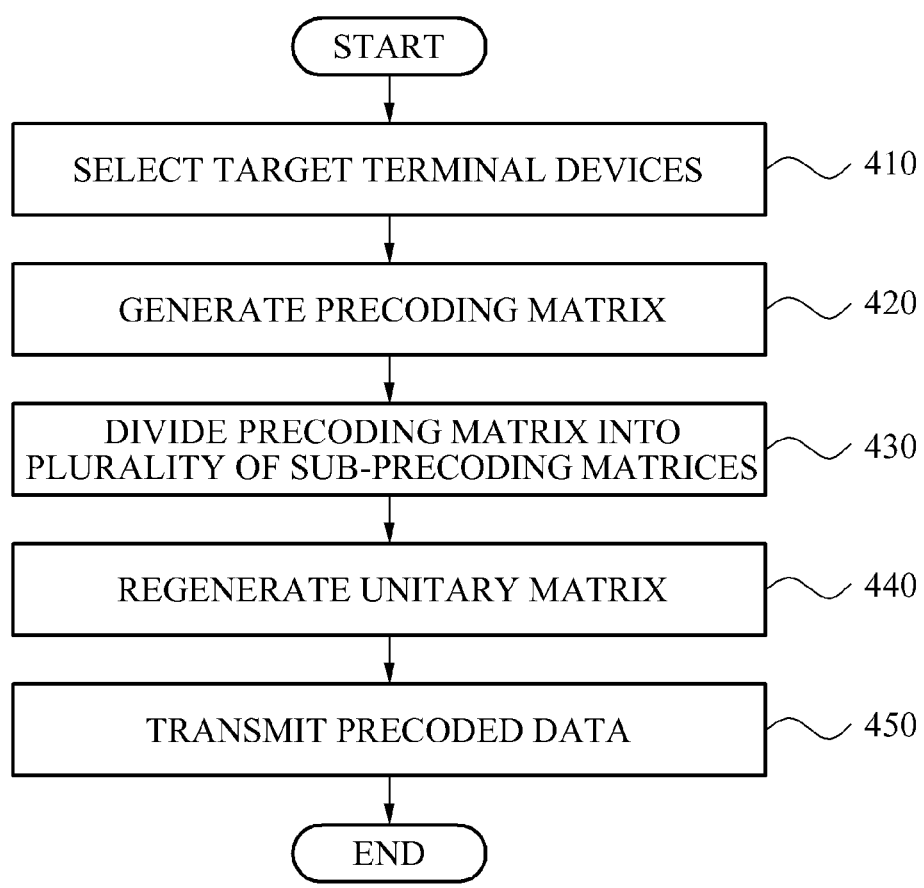
FIG. 4 is a flowchart illustrating a method of operating a precoding apparatus according to an embodiment.

FIG. 4 illustrates a method of operating the precoding apparatus 100 of FIG. 2 according to an embodiment.

In operation 410, the terminal selector 120 may select target terminal devices based on feedback information received from the terminal devices 200.

In this example, at least two target terminal devices may be selected from the plurality of terminal devices 200 using a maximum SINR user selection scheme or a modified greedy user selection scheme.

The feedback information may include channel quality information and channel direction information. The plurality of terminal devices 200 may generate the feedback information based on a common pilot transmitted from the precoding apparatus 100, and feed back the generated feedback information.

In operation 420, the precoding matrix generator 130 may generate a precoding matrix based on channel direction information of the selected target terminal devices. For example, the channel direction information may include transmission precoding vector information preferred by each of the terminal devices 200. The precoding matrix generator 130 may generate the precoding matrix including transmission precoding vectors preferred by the selected terminal devices.

In operation 430, the unitary matrix preprocessor 140 may divide the precoding matrix into a plurality of sub-precoding matrices to calculate unitary vectors having a direction increasing a sum of inner products with respect to the precoding vectors.

For example, the unitary matrix preprocessor 140 may divide the precoding matrix into the plurality of sub-precoding matrices using a SVD scheme.

In operation 440, the unitary matrix precoding preprocessor 140 may regenerate the unitary matrix through multiplication of sub-precoding matrices having a unitary matrix characteristic among the divided sub-precoding matrices.

For example, according to Equation 3, the unitary matrix preprocessor 140 may regenerate the unitary matrix maximizing the sum of inner products between the unitary vectors, for example, $f_1$ and $f_2$ included in the unitary matrix, and the precoding vectors $p_1$ and $p_2$. In this instance, the unitary vectors $f_1$ and $f_2$ may be orthogonal to each other. The unitary vectors $f_1$ and $f_2$ included in the unitary matrix may be identical to the precoding vectors $p_1$ and $p_2$, or may be vectors adjacent to the precoding vectors $p_1$ and $p_2$.

In operation 450, the precoder 143 may transmit, to the target terminal devices, data precoded using the unitary matrix. The precoded data may be transmitted to the target terminal devices using a dedicated pilot.

In this example, as shown in Equation 4, the precoder 143 may precode data by inserting effective channel information. The effective channel information may include the unitary matrix generated in operation 440.

Figure 5:
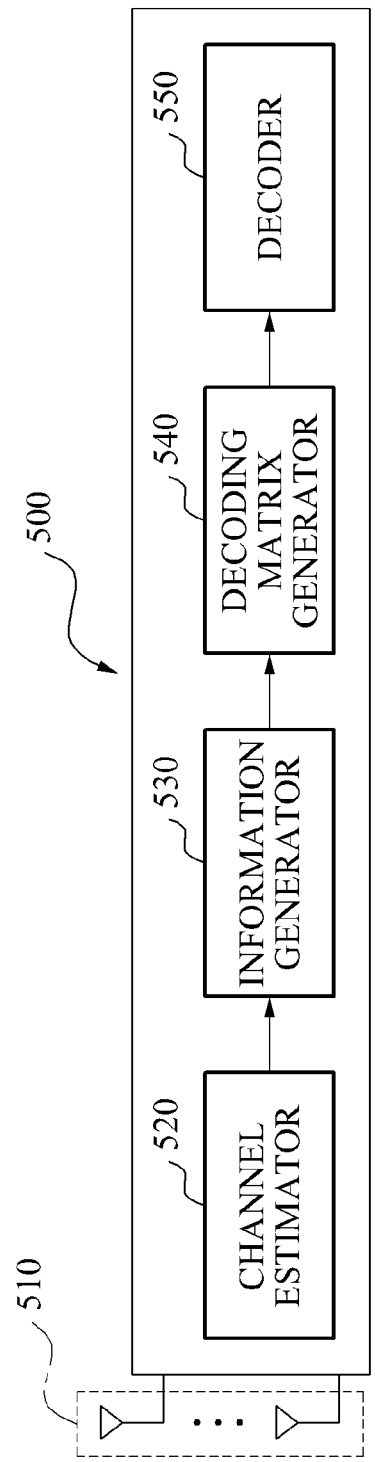
FIG. 5 is a diagram illustrating a configuration of a target terminal device according to an embodiment.

FIG. 5 illustrates a configuration of a target terminal device 500 according to an embodiment.

Referring to FIG. 5, the target terminal device 500 includes a plurality of antennas 510, a channel estimator 520, an information generator 530, a decoding matrix generator 540, and a decoder 550. The target terminal device 500 may be one of the terminal devices 200 of FIG. 1.

The channel estimator 510 may estimate a channel state of a channel formed between the precoding apparatus 100 and the target terminal device 500 based on a common pilot. The common pilot may be received from the precoding apparatus 100 via the plurality of antennas 510. The channel state may be estimated by applying various types of schemes. Further detailed description will be omitted here.

The information generator 530 may generate feedback information based on the estimated channel state. The feedback information may include channel quality information and channel direction information.

For example, the channel quality information may include a SINR measured using the common pilot. The channel direction information may include an index corresponding to a precoding vector in a codebook shared with the precoding apparatus 100. The information generator 530 may quantize the feedback information, and may feed back the quantized feedback information to the precoding apparatus 100 via the plurality of antennas 510.

The decoding matrix generator 540 may extract effective channel information from the precoded data received from the precoding apparatus 100 via the plurality of antennas 510. The precoded data may be received from the precoding apparatus using a dedicated pilot via the plurality of antennas 510. The effective channel information may include a channel matrix generated and a unitary matrix by the precoding apparatus 100.

The unitary matrix generated by the precoding apparatus 100 may include vectors being identical to precoding vectors corresponding to a plurality of target terminal devices, or vectors adjacent to the precoding vectors, based on each of the precoding vectors. The vectors included in the unitary matrix may be orthogonal to each other, and the vectors having the adjacent direction may be vectors having a direction increasing a sum of inner products with respect to the precoding vectors.

The decoding matrix generator 540 may generate a unitary decoding matrix based on the extracted effective channel information. The unitary decoding matrix may have a unitary matrix characteristic.

The decoder 550 may decode the precoded data based on the unitary decoding matrix.

Figure 6:
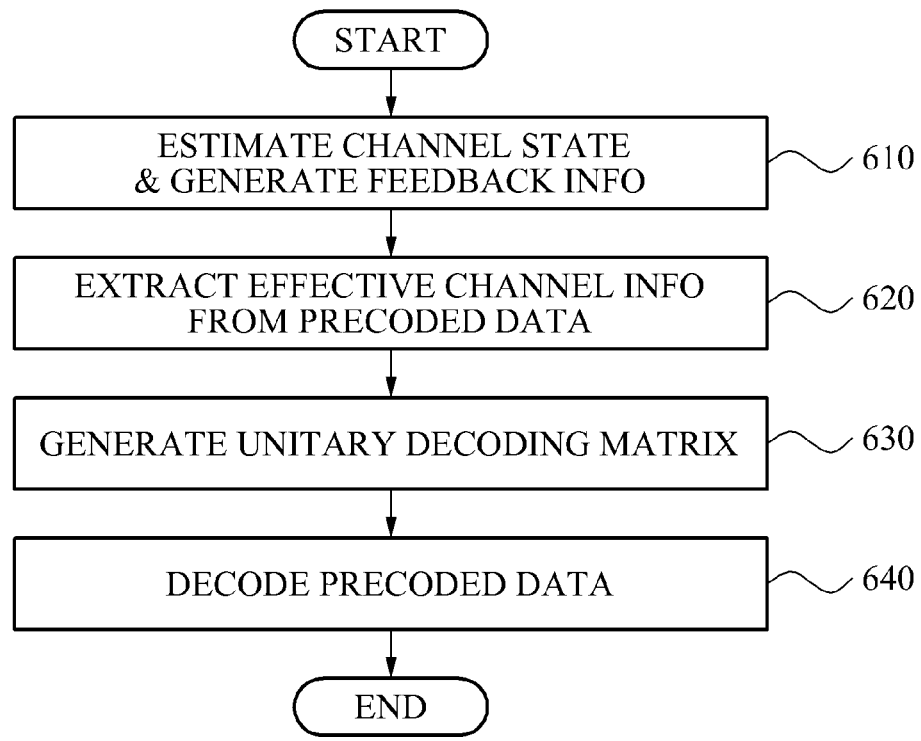
FIG. 6 is a flowchart illustrating a method of operating a target terminal device according to an embodiment.

FIG. 6 illustrates a method of operating the target terminal device 500 of FIG. 5 according to an embodiment.

In operation 610, the channel estimator 510 may estimate a channel state of a channel formed between the precoding apparatus 100 and the target terminal device 500 based on a common pilot. The common pilot may be received from the precoding apparatus 100.

The information generator 530 may generate feedback information based on the estimated channel state. The feedback information may be fed back to the precoding apparatus 100 via the plurality of antennas 510. The feedback information may include channel quality information and channel direction information.

In operation 620, the decoding matrix generator 540 may extract effective channel information from precoded data received via the plurality of antennas 510. The effective channel information may include a channel matrix and a unitary matrix generated by the precoding apparatus 100.

The unitary matrix generated by the precoding apparatus 100 may include vectors being identical to precoding vectors corresponding to a plurality of target terminal devices, or vectors adjacent to the precoding vectors, based on each of the precoding vectors. The vectors included in the unitary matrix may be orthogonal to each other, and the vectors having the adjacent direction may be vectors having a direction increasing a sum of inner products with respect to the precoding vectors.

In operation 630, the decoding matrix generator 540 may generate a unitary decoding matrix based on the extracted effective channel information.

In operation 640, the decoder 550 may decode the precoded data based on the unitary decoding matrix.

A communication system including a single precoding apparatus having multiple antennas, and a plurality of terminal devices, each having multiple antennas, is described above. It is only an example and the communication system may include a plurality of precoding apparatuses, each having multiple antennas, and a plurality of terminal devices, each having multiple antennas. The plurality of precoding apparatuses may communicate with respective corresponding terminal devices. The precoding apparatus may include a base station.

When a single precoding apparatus includes multiple antennas, each of terminal devices may include at least one antenna.

When each of terminal devices includes multiple antennas, the precoding apparatus may include at least one antenna.

According to an embodiment, when target terminal devices are selected, orthogonality between precoding vectors corresponding to a plurality of terminal devices may be used. However, it is only an example and thus the target terminal devices may be selected based on the approximate orthogonality between the precoding vectors. The approximate orthogonality indicates that the precoding vectors are orthogonal to each other within a predetermined error range.

For example, when the error range is preset to 5 degrees, terminal devices having a relatively large SINR may be selected as target terminal devices maintaining an angle between the precoding vectors to be 85 degrees or 95 degrees.

According to an embodiment, in a multi-user MIMO communication system, it is possible to perform precoding using a unitary matrix including vectors adjacent to precoding vectors of target terminal devices. Accordingly, it is possible to enhance throughput of a precoding apparatus and to decrease the complexity.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A unitary precoding apparatus, comprising:
a plurality of antennas configured to:
transmit a common pilot to a plurality of terminal devices; and
receive feedback information generated based on the common pilot;
a terminal selector configured to select at least two target terminal devices from the plurality of terminal devices based on the feedback information;
a precoding matrix generator configured to generate a precoding matrix comprising precoding vectors of the selected at least two target terminal devices; and
a unitary matrix preprocessor configured to:
generate a unitary matrix comprising vectors having a direction increasing a sum of inner products with respect to the precoding vectors and that are identical to or adjacent to the precoding vectors, based on each of the precoding vectors; and
precode data based on the generated unitary matrix.

2. The unitary precoding apparatus of claim 1, wherein the vectors identical to the precoding vectors or the vectors comprising the direction adjacent to the precoding vectors are orthogonal to each other.

3. The unitary precoding apparatus of claim 1, wherein the unitary matrix preprocessor is further configured to:
divide the precoding matrix into a plurality of sub-precoding matrices; and
generate the unitary matrix through multiplication of sub-precoding matrices corresponding to the unitary matrix among the divided sub-precoding matrices.

4. The unitary precoding apparatus of claim 1, wherein the unitary matrix preprocessor comprises:
a calculator configured to calculate the vectors maximizing the sum of inner products with respect to the precoding vectors; and
a unitary matrix generator configured to generate the unitary matrix comprising the calculated unitary vectors.

5. The unitary precoding apparatus of claim 1, wherein the unitary matrix preprocessor is further configured to generate the unitary matrix by applying a singular value decomposition (SVD) scheme to the precoding matrix.

6. The unitary precoding apparatus of claim 1, wherein the unitary matrix preprocessor is further configured to precode the data based on the unitary matrix to insert effective channel information into the precoded data.

7. The unitary precoding apparatus of claim 6, wherein:
each of the antennas is further configured to transmit the precoded data with the inserted effective channel information to the at least two target terminal devices via a dedicated pilot; and
the effective channel information comprises the unitary matrix.

8. The unitary precoding apparatus of claim 1, wherein:
the terminal selector is further configured to select the at least two target terminal devices based on at least one of channel quality information and channel direction information included in the feedback information; and
the channel direction information comprises precoding vector information of the selected at least two target terminal devices.

9. A unitary precoding method, comprising:
transmitting a common pilot to a plurality of terminal devices;
receiving feedback information generated based on the common pilot;
selecting at least two target terminal devices from the plurality of terminal devices based on the feedback information;
generating a precoding matrix comprising precoding vectors of the at least two target terminal devices;
generating a unitary matrix comprising vectors having a direction increasing a sum of inner products with respect to the precoding vectors and that are identical to or adjacent to the precoding vectors, based on each of the precoding vectors; and
precoding data based on the generated unitary matrix.

10. The unitary precoding method of claim 9, wherein the vectors identical to the precoding vectors or the vectors comprising the direction adjacent to the precoding vectors are orthogonal to each other.

11. The unitary precoding method of claim 9, wherein the generating of the unitary matrix comprises:
dividing the precoding matrix into a plurality of sub-precoding matrices; and
generating the unitary matrix comprising the vectors identical to the precoding vectors or the vectors comprising the direction adjacent to the precoding vectors through multiplication of sub-precoding matrices corresponding to the unitary matrix among the divided sub-precoding matrices.

12. The unitary precoding method of claim 9, wherein the generating of the unitary matrix comprises:
calculating the unitary vectors maximizing the sum of inner products with respect to the precoding vectors; and
generating the unitary matrix comprising the calculated unitary vectors.

13. The unitary precoding method of claim 9, wherein the generating of the unitary matrix comprises generating the unitary matrix by applying a singular value decomposition (SVD) scheme to the precoding matrix.

14. The unitary precoding method of claim 9, further comprising transmitting the precoded data to the at least two target terminal devices via a dedicated pilot.

15. The unitary precoding method of claim 14, wherein:
the precoding comprises precoding the data based on the unitary matrix to insert effective channel information into the precoded data;
the transmitting comprises transmitting the precoded data with the inserted effective channel information to the at least two target terminal devices via the dedicated pilot; and
the effective channel information comprises the unitary matrix.

16. The unitary precoding method of claim 9, wherein:
the selecting comprises selecting the at least two target terminal devices based on at least one of channel quality information and channel direction information included in the feedback information; and
the channel direction information comprises precoding vector information of the selected at least two target terminal devices.

17. A terminal device, comprising:
a channel estimator configured to estimate a channel state of a channel formed between the terminal device and a precoding apparatus based on a common pilot;
an information generator configured to generate feedback information based on the estimated channel state;
at least one antenna configured to:
feed back the channel state to the precoding apparatus; and
receive data precoded based on the feedback information;
a decoding matrix generator configured to:
extract effective channel information from the precoded data; and
generate a unitary decoding matrix based on the effective channel information; and
a decoder configured to decode the precoded data based on the unitary decoding matrix, wherein
a unitary matrix included in the effective channel information comprises vectors identical to precoding vectors generated based on the feedback information, or vectors adjacent to the precoding vectors, based on each of the precoding vectors, and
the unitary matrix vectors have a direction increasing a sum of inner products with respect to the precoding vectors.

18. The terminal device of claim 17, wherein:
the vectors identical to the precoding vectors or the vectors comprising the direction adjacent to the precoding vectors are orthogonal to each other; and
the precoded data is received via a dedicated pilot.

19. A unitary decoding method, comprising:
estimating a channel state based on a common pilot;
generating feedback information based on the estimated channel state;
feeding back the feedback information;
extracting, from precoded data, effective channel information generated based on the feedback information;
generating a unitary decoding matrix based on the effective channel information; and
decoding the precoded data based on the unitary decoding matrix, wherein
a unitary matrix included in the effective channel information comprises vectors identical to precoding vectors generated based on the feedback information, or vectors adjacent to the precoding vectors, based on each of the precoding vectors, and
the unitary matrix vectors have a direction increasing a sum of inner products with respect to the precoding vectors.

20. The unitary decoding method of claim 19, further comprising:
receiving the precoded data via a dedicated pilot, wherein the vectors identical to the precoding vectors or the vectors comprising the direction adjacent to the precoding vectors are orthogonal to each other.

21. A non-transitory computer-readable storage medium storing a program for instructing a computer to perform a unitary precoding method, comprising:

transmitting a common pilot to a plurality of terminal devices;
receiving feedback information generated based on the common pilot;
selecting at least two target terminal devices from the plurality of terminal devices based on the feedback information;
generating a precoding matrix comprising precoding vectors of the at least two target terminal devices;
generating a unitary matrix comprising vectors having a direction increasing a sum of inner products with respect to the precoding vectors and that are identical to or adjacent to the precoding vectors, based on each of the precoding vectors; and
precoding data based on the generated unitary matrix.

22. A non-transitory computer-readable storage medium storing a program for instructing a computer to perform a unitary decoding method, comprising:

estimating a channel state based on a common pilot;
generating feedback information based on the estimated channel state;
feeding back the feedback information;
extracting, from precoded data, effective channel information generated based on the feedback information;
generating a unitary decoding matrix based on the effective channel information; and
decoding the precoded data based on the unitary decoding matrix, wherein
a unitary matrix included in the effective channel information comprises vectors identical to precoding vectors generated based on the feedback information, or vectors adjacent to the precoding vectors, based on each of the precoding vectors, and
the unitary matrix vectors have a direction increasing a sum of inner products with respect to the precoding vectors.

* * * * *